US007420944B2

United States Patent
Norris et al.

(10) Patent No.: US 7,420,944 B2
(45) Date of Patent: Sep. 2, 2008

(54) METHOD OF FORMING DIRECTIONAL WIRELESS NETWORKS USING IN-BAND CHANNELS

(75) Inventors: Paul R. Norris, Issaquah, WA (US);
Douglas P. Nast, Issaquah, WA (US);
Guangyu Pei, Sammamish, WA (US);
Jae H. Kim, Bellevue, WA (US)

(73) Assignee: The Boeing Company, Chiacgo, IL (US)

( * ) Notice: Subject to any disclaimer, the term of this patent is extended or adjusted under 35 U.S.C. 154(b) by 165 days.

(21) Appl. No.: 11/251,375

(22) Filed: Oct. 14, 2005

(65) Prior Publication Data
US 2007/0087758 A1    Apr. 19, 2007

(51) Int. Cl.
*H04Q 7/00* (2006.01)
(52) U.S. Cl. .................... 370/332; 370/320; 370/230; 370/252; 370/337; 370/347; 370/442; 709/231; 709/238; 455/456.1; 455/450
(58) Field of Classification Search ............... 370/332, 370/230, 320, 252, 337, 347, 442; 709/231, 709/238; 455/456.1, 450, 13.1
See application file for complete search history.

(56) References Cited

U.S. PATENT DOCUMENTS

| | | | | |
|---|---|---|---|---|
| 6,445,917 B1 * | 9/2002 | Bark et al. | ................... | 455/423 |
| 6,901,064 B2 * | 5/2005 | Cain et al. | ................... | 370/337 |
| 6,904,032 B2 * | 6/2005 | Cain | ........................... | 370/337 |
| 6,982,987 B2 * | 1/2006 | Cain | ........................... | 370/442 |
| 7,027,409 B2 * | 4/2006 | Cain | ........................... | 370/252 |
| 7,027,773 B1 * | 4/2006 | McMillin | ................... | 455/41.2 |
| 7,065,373 B2 * | 6/2006 | Rodgers et al. | ............. | 455/502 |
| 7,116,988 B2 * | 10/2006 | Dietrich et al. | ........... | 455/456.1 |
| 7,158,484 B1 * | 1/2007 | Ahmed et al. | ................ | 370/254 |
| 7,174,170 B2 * | 2/2007 | Steer et al. | ................... | 455/446 |
| 7,177,644 B2 * | 2/2007 | Smith et al. | .................. | 455/445 |
| 7,274,936 B2 * | 9/2007 | Zangi et al. | ................... | 455/442 |
| 7,298,327 B2 * | 11/2007 | Dupray et al. | ............... | 342/451 |
| 7,304,976 B2 * | 12/2007 | Mao et al. | .................... | 370/338 |
| 2002/0094823 A1 * | 7/2002 | Suzuki et al. | ................ | 455/456 |

* cited by examiner

*Primary Examiner*—Marceau Milord
(74) *Attorney, Agent, or Firm*—McNees Wallace & Nurick, LLC (57) ABSTRACT

The present invention is directed to a method of forming a mobile network using Phased Array Antennas. Mobile nodes search for nodes with which to form a network by either transmitting low level announcement signals on a wide spoiled beam directional antenna at progressively increasing power levels, or by receiving announcement signals using a high-gain, narrow directional beam. Low power announcements are compensated for by processing gain in the receive modem. Nodes randomly decide at each step of the scan whether to transmit or receive. Two control slots in an epoch are used for neighbor discovery. The first control slot is to announce or receive an announcement, and the second control slot is used to acknowledge the receipt of an announcement packet. The neighbor discovery process uses in-band communications. The directional communications permit simultaneous links in close proximity to other links without interference.

21 Claims, 8 Drawing Sheets

METHOD OF FORMING DIRECTIONAL WIRELESS NETWORKS USING IN-BAND CHANNELS

FIELD OF THE INVENTION

The present invention is directed to mobile communications networks, and more particularly to a method of forming mobile ad hoc wireless networks using directional antennas.

BACKGROUND OF THE INVENTION

Mobile ad hoc networking technology (MANET) describes a self-organized, self-healing wireless interconnection of communications devices to form an independent communications network, or a network extension of a wired networking infrastructure. The most important characteristic that distinguishes MANET is the absence of a fixed infrastructure. The MANET network lacks any central server to support standard networking functions such as routing, security, neighbor discovery and data forwarding.

MANET has application to military communications networks. Security is of paramount concern in military applications. Low probability of detection (LPD), low probability of interception (LPI), low probability of enemy exploitation (LPE) and anti-jamming capability (AJ), are features that are advantageous in a mobile network for military operations. These features would also be required for other mobile network communications involving communication of confidential or classified information.

Normally, when a node attempts to join a mobile network during a neighbor discovery (ND) process, an announcement packet (AP) or message is broadcast from the node using an omni-directional antenna. The announcement packet includes the location of the node and other information necessary for the node to gain access the network. Announcement packets that are broadcast using an omni-directional transmission source are susceptible to detection or interception by enemy receivers or other unintended recipients. Since the omni-directional broadcast may be received by anyone within range, the signals should be low power to avoid detection by an enemy. This is problematic since they must be high enough in power to discover neighbors at the maximum network formation range. Furthermore, omni-directional receivers for receiving the AP signals may be easily jammed by enemy transmitters.

Typically during the ND process, the announcement messages or packets are transmitted in a different frequency from that of the network communication band in order to avoid interference with the ongoing communications between nodes already connected to the network. This additional frequency band, or out-of-band, signal consumes more of the limited RF spectrum.

In contrast to the omni-directional antenna, directional antennas, such as Phased Array Antennas (PAA) can focus radiation energy in a narrow angle to form wireless links between nodes in a network. Directional antennas have advantageous properties for communications networking such as high data transmission rates, long range communication, LPD, LPE, LPI and AJ as mentioned above. PAAs may also be electronically guided to rapidly multiplex the available bandwidth amongst multiple communicating peers. PAAs can be redirected in a few microseconds, which is a characteristic that cannot be achieved with mechanically-steered antennas.

Heretofore, directional antennas have been unsuitable for MANET, because directional antenna communications require the transmitting and receiving nodes to be aligned. Even if two nodes are within range, they cannot discover each other if their respective antennas are not aligned. Alignment of the antennas is unlikely to occur until the relative locations of both nodes are discovered by each of the nodes. The node locations have to be established by omni-directional antenna communications as described above. In that case, an additional antenna must be provided at the node, dedicated solely to the ND process, and adding additional cost and weight to the node.

Therefore, there exists a need for a mobile communications networking system and method using directional antennas for neighbor discovery and data communications.

SUMMARY OF THE INVENTION

The present invention is directed to a method of mutually discovering relative locations of a plurality of mobile nodes to form a data communications network, the method comprising initializing a signal transmission power level at a minimum power level; initializing an antenna scan direction in a first predetermined direction of a plurality of directions; randomly selecting, for each mobile node of the plurality of mobile nodes, to transmit or to receive an announcement packet during one scan direction; transmitting, by at least one node, an announcement packet via an antenna beam in response to randomly selecting to transmit an announcement packet, the antenna beam being directed in the predetermined direction in a first synchronized time interval; focusing, by at least one node, an antenna receiving beam to receive an announcement packet transmitted from a transmitting node in response to randomly selecting to receive an announcement packet in the first synchronized time interval; resetting the first predetermined direction of the plurality of directions and repeating the steps of transmitting an announcement packet and focusing a receiving beam in response to an announcement signal not being received by a receiving node; and repeating the steps of resetting the direction for each scan, and repeating the steps of transmitting an announcement packet and focusing a receiving beam in response to an announcement signal not being received by a receiving node until all of the plurality of directions have been scanned.

The method also includes incrementing the power level by a predetermined power level increment in response to a reservation signal not being received by a transmitting node in all scan directions at the initial power level, and repeating the steps of transmitting an announcement packet and focusing a receiving beam in response to an announcement signal not being received by a receiving node, resetting the direction for all of the plurality of scan directions; for progressive power level increments until the signal transmission power level exceeds a predetermined maximum power level; transmitting a reservation signal from the receiving node back to the transmitting node in a second synchronized time interval, in response to a receiving node detecting an announcement packet from the transmitting node; negotiating a data link between the transmitting node and the receiving node in response to the transmitting node receiving the reservation signal from the receiving node; aligning the antenna from the transmitting node with the antenna from the receiving node in response to negotiating a data link; and configuring the transmitting node to transmit a narrow, directional high power beam for communication with the receiving node.

In another aspect, the invention is directed to a method of forming a mobile ad hoc network of a plurality of mobile nodes using directional antennas comprising randomly assigning each node of a plurality of nodes randomly between a transmitting node and a receiving node; directionally scanning over a predetermined range associated with a first power level with a first beam carrying an announcement signal, for a transmitting node; simultaneously with the scanning of the first beam, directionally scanning at a highest power level with a second beam, for a receiving node; increasing the level of the first power level to extend the predetermined range being scanned by the transmitting node, for a plurality of successive power level increments, up to a maximum power level; transmitting a reserve signal from the receiving node to the transmitting node the announcement signal; and establishing a data link between the receiving node and the transmitting node for high speed high gain operational communications in response to the receiving node receiving a transmitted signal from the transmitting node.

Also, the announcement signals and the reserve signals are transmitted according to the spatial time division multiple access protocol comprising: synchronizing a plurality of potentially mobile nodes to predefined epochs of time for communication scheduling; dividing the epochs of time into a plurality of equal time slots; assigning at least two of the equal time slots as control signaling slots; simultaneously transmitting or receiving an announcement packet in a first control signaling time slot; transmitting a reservation signal in response to a received signal in a second control signaling time slot; establishing a data link in response to receiving a reservation signal; and communicating between at least two mobile nodes via directional antenna high gain high rate data link using at least two of the plurality of equal time slots not assigned to control signaling.

The present invention is also directed to a mobile ad hoc communications network system. The system includes a plurality of mobile nodes and a communications protocol for communications between mobile nodes. Each mobile node includes at least one directional antenna. The directional antennae have a plurality of power levels for scanning; and a control device for transmitting and receiving data packets. The control device is configured for adjusting a power level of the directional antennae at a plurality of successively increasing power levels and directing the directional antennae in a plurality of directions.

Advantages of the present invention include low probability of detection (LPD), low probability of interception (LPI), low probability of enemy exploitation (LPE), and anti-jamming (AJ) capabilities.

A further advantage of the present invention is that it provides a bounded discovery time for nodes that are relatively distant.

Another advantage of the present invention is that nodes are more likely to discover the nearest neighbor first.

Yet another advantage of the present invention is that the highest antenna gains can be used by both transmitters and receivers to discover neighbors at great distances.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention provides a method of forming a mobile network using directional antennas. Directional antennas, such as Phased Array Antennas (PAA) can focus radiation energy in a narrow angle to form wireless links between nodes in a network. Directional antennas have a number of advantageous properties for communications networking—high data transmission rates, long range communication, as well as LPD, LPE, LPI and AJ as mentioned above. The present invention implements neighbor discovery with blind announcements without sacrificing the inherent LPD advantages of directional antennas.

Figure 1:
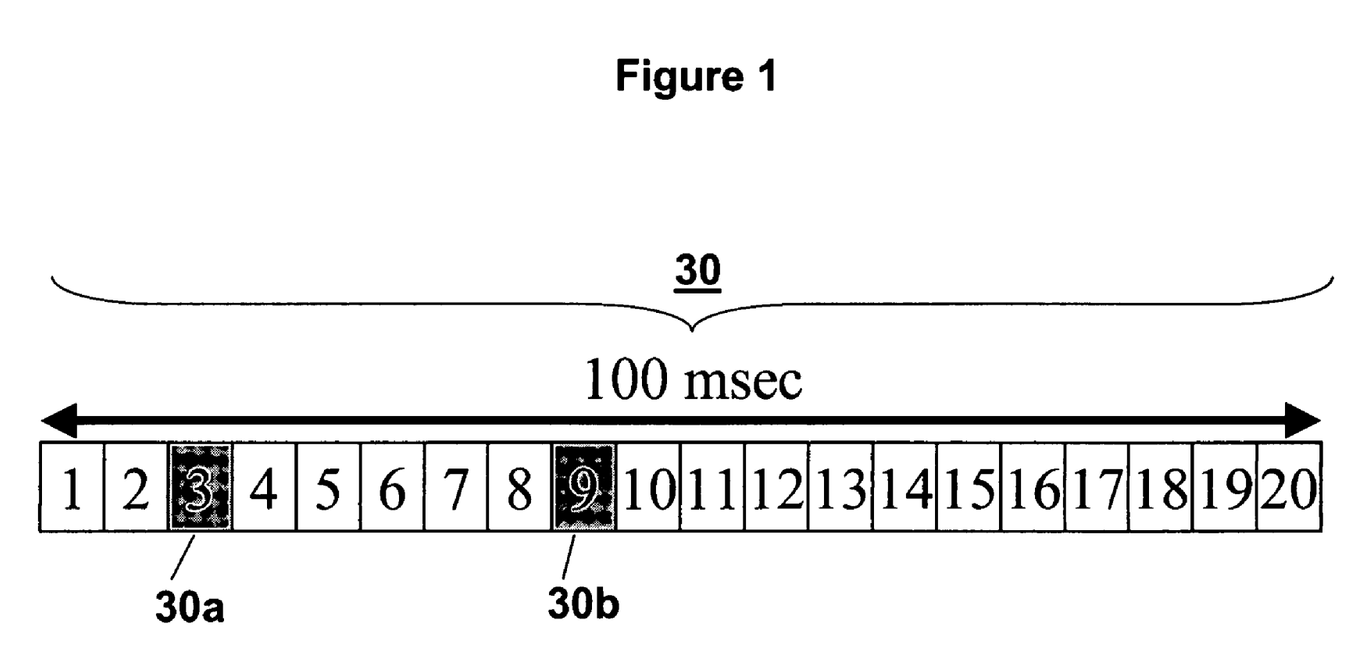
FIG. 1 is a representation of the Spatial-Time Division Multiple Access (S-TDMA) epoch structure used in an embodiment of the neighbor discovery process.

The neighbor discovery process, i.e., the sending and receiving of the announcement packets (AP), exchanging position information and selecting slots for a persistent link, is based on Spatial-Time Division Multiple Access (S-TDMA) protocol architecture. Referring to FIG. 1, the neighbor discovery process of the present invention uses a control structure or architecture generally designated as 30. The control structure 30 corresponds to a synchronous time cycle, or epoch 30 nominally consists of many normal communication slots and a smaller number of slots constituting a control channel reserve. In the example of FIG. 1, epoch 30 is one hundred milliseconds in duration, and is divided into twenty consecutively numbered slots, each slot representing an equal subdivision of the epoch 30. Two slots, 30a and 30b, i.e. slots 3 and 9 in FIG. 1 constitute the control channel reserve. It is to be understood that any two slots can be selected for the control channel reserve and neighbor discovery. The duration of the epoch 30, the number of slots per epoch, and the number of slots reserved for control may be varied. The parameters in FIG. 1 are given by way of example and not limitation.

During each epoch 30, one direction (i.e., piece of solid angle) per configured antenna can be searched. The term solid angle is understood as the angle that, seen from the center of a sphere, includes a given area on the surface of that sphere. The value of the solid angle is numerically equal to the size of that area divided by the square of the radius of the sphere. This constitutes one step in the scan. Notionally, assuming that the total assigned search space is $4\pi$ steradians, the number of directions to complete one scan round is given by N where $N \sim (2\pi/\text{theta})^2$, and theta is the width of the search beam (i.e., 3 dB beam width). Assuming n antennas, one step can search n directions. Completion of all directions in the assigned solid angle search space at one power level is defined to be a scan round. If multiple (e.g., 8) power levels are employed, completion of a round at each level is a complete scan.

Figure 2:
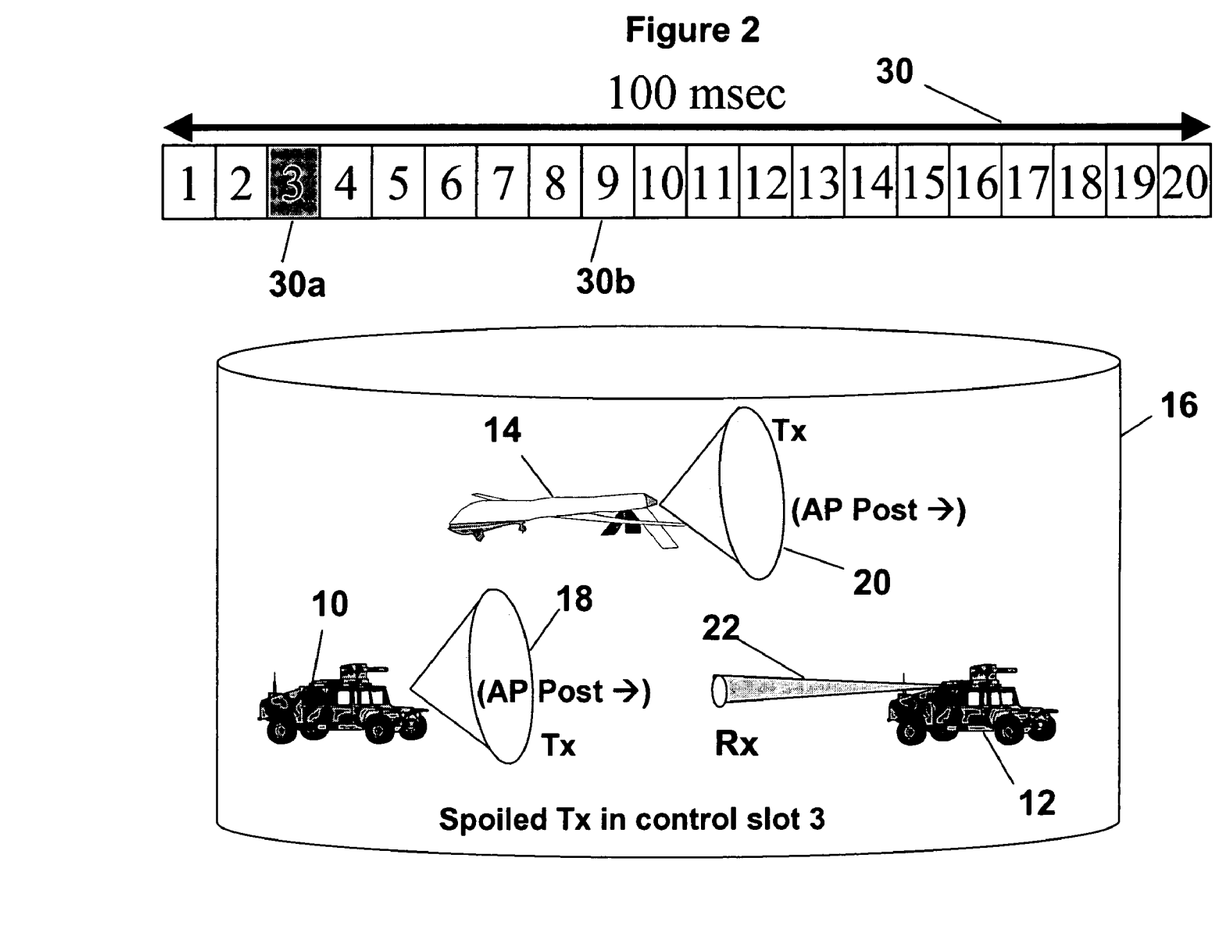
FIG. 2 is an example of a blind announcement during the ND process.
Figure 3:
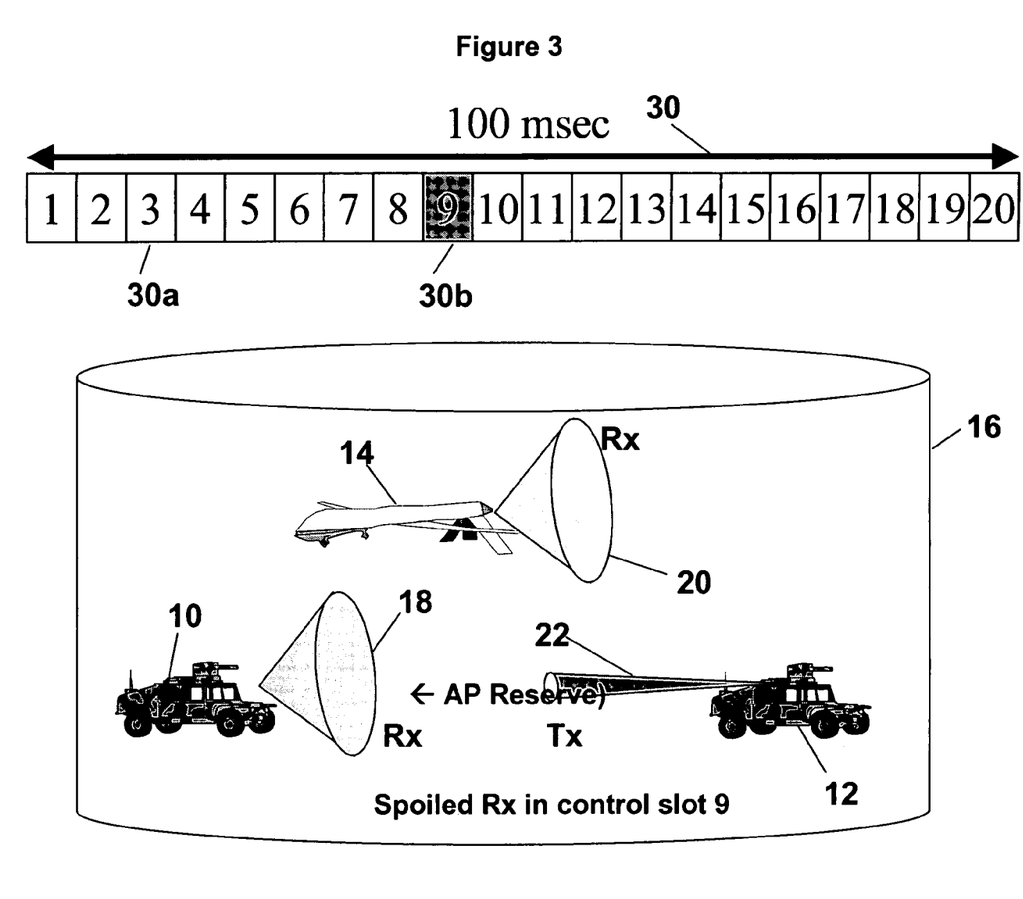
FIG. 3 is an example of a response to a blind announcement during the ND process.

FIGS. 2 and 3 illustrate an exemplary application of neighbor discovery using directional antennas to form a mobile ad hoc network. Three mobile nodes—a pair of ground vehicles 10, 12, and an aircraft 14 are deployed in a military theatre with boundaries defined by an imaginary cylinder 16. The beams 18, 20, and 22 scan a configurable amount of solid angle, dependent on the number of antennas and disposition of nodes. For example, ground nodes might merely search $2\pi$ steradians up and ignore the opposite hemisphere, i.e., the down hemisphere, whereas airborne nodes might merely search $2\pi$ steradians down and ignore the opposite hemisphere, i.e., the up hemisphere. In addition, nodes with n burst modems and n quasi-orthogonal antennas might produce n simultaneous beams in the same scan step, thus covering the assigned solid angle of search space in 1/n the number of steps. The beams 18, 20 and 22 scan their assigned solid angle in steps at predetermined intervals.

In FIG. 2, during the first control slot 30*a* (e.g., slot 3) of the TDMA epoch 30 the first vehicle 10 transmits a low-energy, wide beam signal 18, the aircraft 14 transmits a low-energy, wide beam signal 20, and the second vehicle 12 generates a high-gain, narrow reception beam 22. The low-energy, wide beams 18, 20 (also referred to as spoiled beams) may have up to a 120° angular width. When a reception beam 22 receives an AP Post message in first control slot 30*a* over a spoiled transmission beam 18, vehicle 12 learns the location and free slots of node 10. By assumption, in this figure the announcement of node 14 is unheard by the other nodes 10, 12.

In FIG. 3, the handshake is completed in a second control slot 30*b* (e.g., slot 9) in the same TDMA epoch 30. Node 12 makes a slot selection from the free list received in slot 3, and returns its location to node 10 in an AP Reserve message in the second control slot 30*b*. Note that the AP Reserve is sent with a narrow beam 22, since node 12 now knows the location of node 10, and that node 10 receives with a spoiled beam 18, since node 10 does not yet know the node with which it might have begun communication. The link activation agreement inherent in the AP Post/Reserve transaction is implemented in the succeeding 100 msec epoch, when nodes 12 and 10 begin normal operational communications using the agreed-to slots (i.e., any slots except the reserved control slots 3 and 9).

Each mobile node decides whether to transmit an AP in a spoiled wide beam, or to receive directionally, at each scan step. A spoiled beam is constructed by selectively turning a certain number of elements in the PAA off. As described more fully below, the decision whether to transmit or receive is a random decision, and every node decides independently of other nodes, whether to transmit or receive. If a node transmits an AP (Post AP), a low-energy spoiled beam signal is sent, e.g., transmission beam 18, 20 from FIG. 2. If a node decides to receive, it focuses a high gain directional beam (e.g., reception beam 22 from FIG. 2) in the "next" direction in the search process. The receive beam directions in 30*a* (e.g., slot 3) are synchronized across the network using GPS. This is referred to as "receive lock step". The meaning of receive lock step is that for all nodes receiving during time slot 30*a*, the bore sites of each receiving (Rx) beam have the same azimuth and elevation, as defined by the plane tangent to the World Geodetic System 84 (WGS-84) reference ellipsoid at the nodes' current location. This means that body rotations relative to the local tangent are removed before the next azimuth and elevation are programmed into the beam former. If a receiving node receives a Post AP in slot 30*a* from FIG. 2, it then transmits a second AP (Reserve AP) in a second predetermined slot in the epoch 30, i.e. 30*b* from FIG. 3, using a high-energy directional beam aligned with the location of the node that sent the Post AP. When the originating node of the Post AP receives the Reserve AP message, a link activation may be agreed to. This would take effect in the next epoch 30.

The scanning process is configured into multiple rounds. A transmitting node transmits the Post AP at a minimum power level until the first scan round is complete. In each successive round, the transmitting node increases the transmission power by a predetermined level, e.g., 6 dB until the node reaches the maximum transmission power. The number of power levels in this process is variable based on the characteristics of the operational environment. A greater number of power levels (i.e., scan rounds) require more time to complete the scanning process, and a smaller number of power levels may increase the probability of adverse detection. By incrementally increasing the transmission power, the probability of detection by others is reduced, since the mobile node transmits at the minimum power level necessary to reach the nearest neighbor node.

Figure 4A:
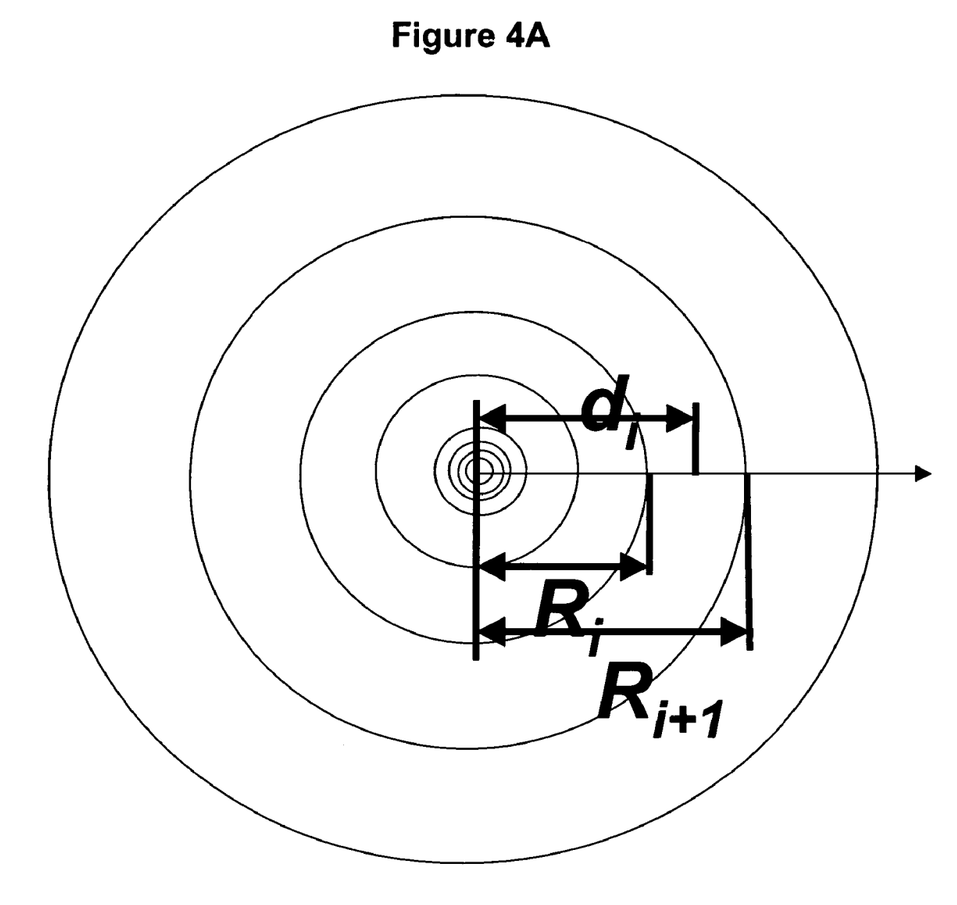
FIG. 4A is a graphic depiction of coverage regions corresponding to each of 8 transmit power levels for ND.
Figure 4B:
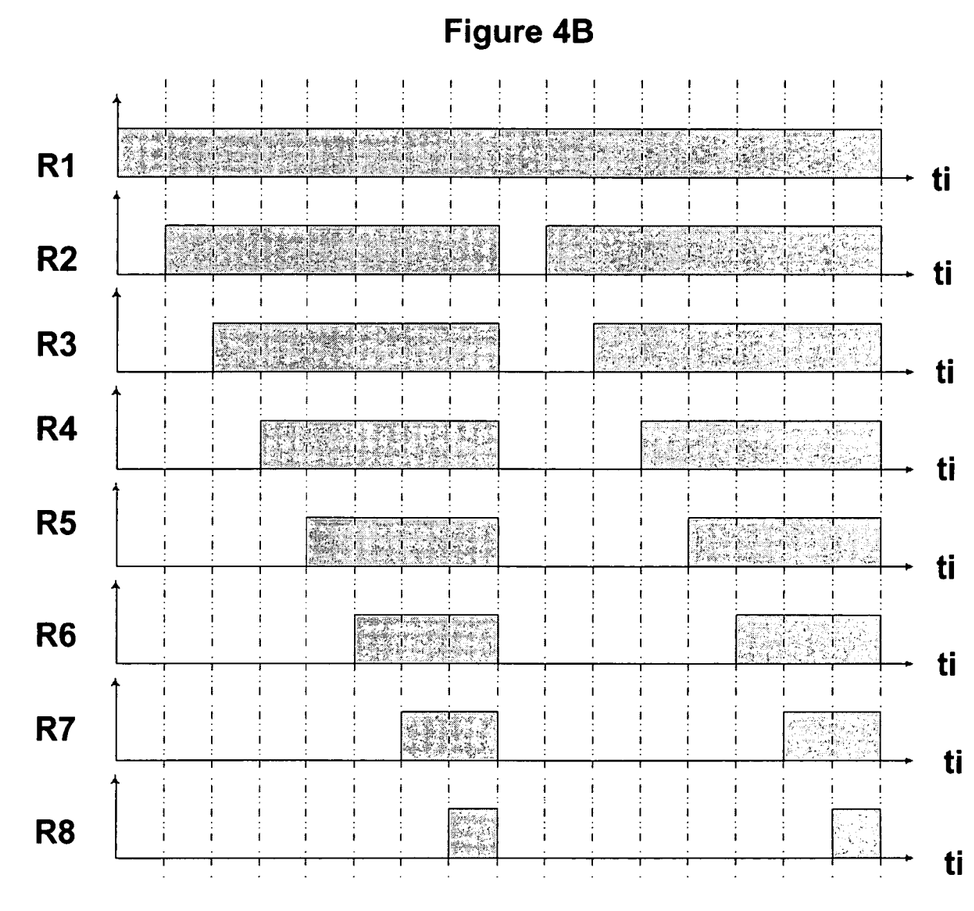
FIG. 4B depicts 16 discovery scan rounds, with those in which a neighbor in region Ri may be reached from the origin of FIG. 4A shown shaded.
Figure 5:
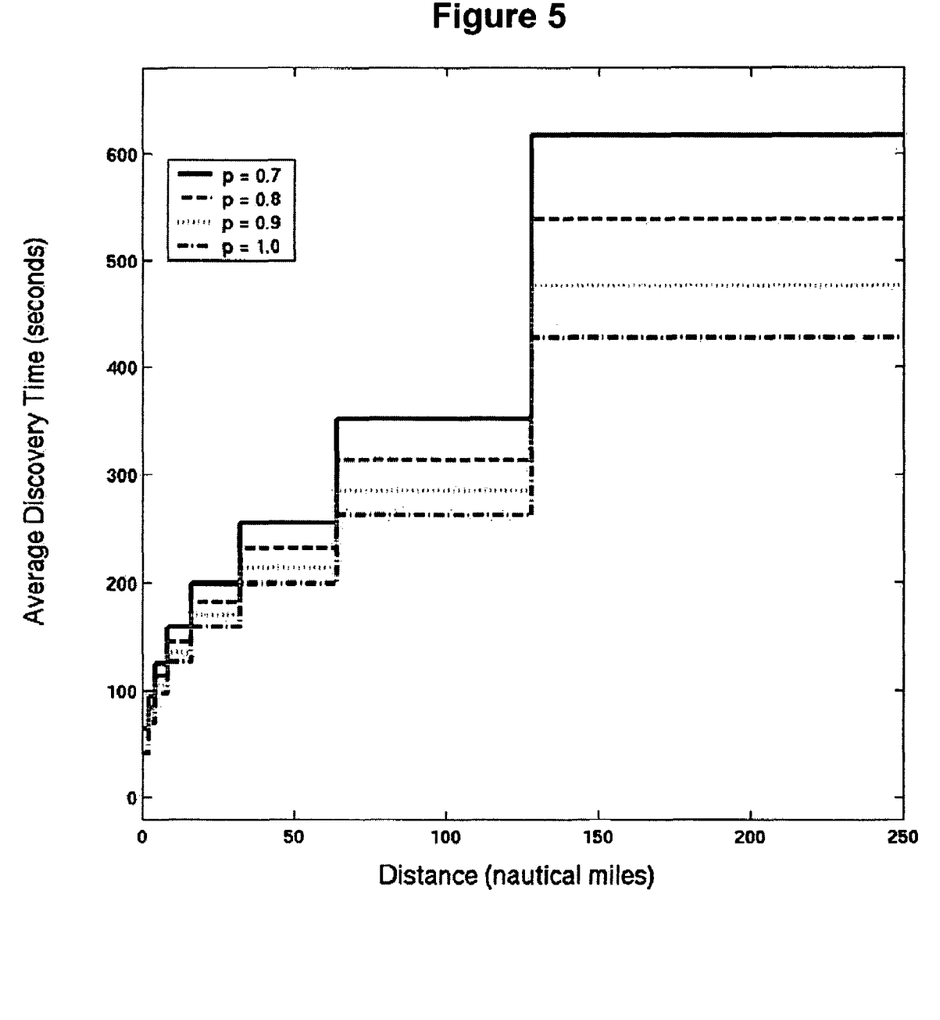
FIG. 5 is a graph depicting Average Discovery Time versus Distance between nodes.

Referring next to FIGS. 4A and 4B, a graphical analysis of the neighbor discovery method and protocol is presented. A series of concentric circles define increasing levels of transmission power from a transmitting node attempting to discover a neighboring node. The distance between the respective nodes is designated as $d_i$, and transmission ranges $R_i$ and $R_{i+1}$ represent the range of the beam at a specified transmission power level (EIRP). With this basis, FIG. 5 presents quantitative results for discovery time for an example embodiment. In the following equations, the variables are defined as follows:

N=number of scanning directions $T_e$=the duration of the epoch

L=number of transmission power levels $R_i$=the range of each transmission power level, where i is an integer, i=0, . . . , L, where $R_0$=0

An average neighbor discovery time can be calculated as follows, conditioned on the neighbor discovery yielding a successful communications linkage. The discovery time is in the range [$iNT_e$, $(1+i)NT_e$]. Assuming the relative direction between two nodes is uniformly distributed over the $4\pi$ sphere, the average discovery time is $((2i+1)/2) NT_e$, where i=0, 1, . . . , L−1 (when i=0, $0<d_0 \leq R_i$). The discovery time $T_{si}$, if the current round is a success, is determined by the following equation:

$$T_{s_i} = \frac{2i+1}{2} NT_e$$

Assuming the probability of success to be p, the discovery time $T_{di}$ is determined by the following equation:

$$T_{d_i} = p \sum_{k=i}^{L-1} (T_{s_k}(1-p)^{k-i}) + (1-p)^{L-i}(LNT_e + T_{d_i})$$

Assuming that the nodes are uniformly distributed, the probability $P_{di}$ that the distance between two nodes is $d_i$—i.e., $R_i < d_i \leq R_{i+1}$, determined by the following:

$$p_{d_i} = \frac{\frac{4}{3}\pi R_{i+1}^3 - \frac{4}{3}\pi R_i^3}{\frac{4}{3}\pi R_L^3} = \frac{R_{i+1}^3 - R_i^3}{R_L^3}$$

Thus, the average discovery time between 2 nodes that are within $R_L$, is given by:

$$T = \sum_{i=0}^{L-1} T_{d_i} \times p_{d_i}$$

$$= NT_0 \left( \sum_{i=0}^{L-1} \frac{p \sum_{k=i}^{L-1} \frac{2k+1}{2}(1-p)^{k-i} + (1-p)^{L-i} L}{1-(1-p)^{L-i}} \times \frac{R_{i+1}^3 - R_i^3}{R_L^3} \right)$$

The probability of success p is determined by the neighbor discovery protocol and the packet loss rate. Assuming no packet loss, p=½, since two nodes can only discover each other when one node is transmitting and the other is receiving in the first ND slot of a ND slot pair. If the packet success rate is $p_{success}$, and assuming packet loss is independent of the process where a node determines its role, i.e., transmitting or receiving, in the first ND slot, the probability of success is p=½ $p_{success}$.

Figure 6:
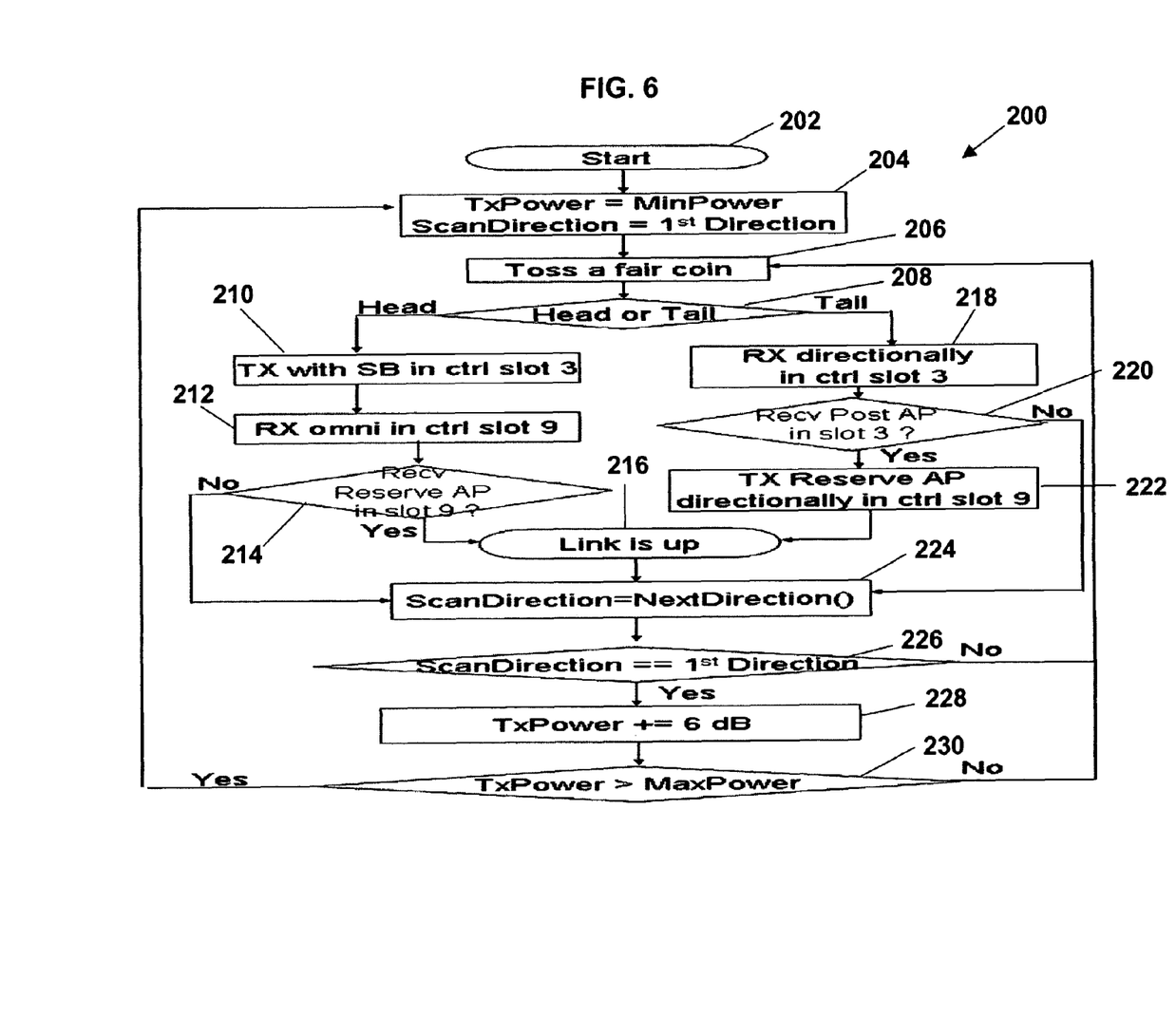
FIG. 6 is a flow chart of an embodiment of the neighbor discovery process of the present invention.

Referring next to FIG. 6, a method of the present invention is illustrated by a flow chart 200. A new scan or cycle starts at step 202 (Start). In step 204, the transmission power is set at the minimum power level, and the scan direction is set at a first direction. In the next step 206, a random binary selection process (e.g., tossing a fair coin) is implemented. In step 208, a decision is made based on the outcome of the random coin toss. If the coin toss 206 results in a first result (e.g., head), then the "head" node transmits with a wide beam in the first ND slot (e.g., slot 3) as indicated in step 210, and proceeds to step 212. In step 212, the "head" node receives with another wide beam in the second ND slot. In step 214, the "head" node determines if a Reserve AP signal was received in the second ND slot. If in step 214 it is determined that a Reserve AP signal was received, the "head" node proceeds to step 216. In step 216, the link is established and each appears in the neighbor table of the other.

Returning to the decision step 208, if the random process generates a second result (e.g., tail), the "tail" node is set to receive directionally via a high gain narrow beam in the first ND slot in the first scan direction at step 218. At the conclusion of slot 3 the "tail" node then proceeds to step 220 to determine if a Post AP was received in first ND slot. If yes, then the "tail" node transmits a Reserve AP response directionally back to the announcer or transmitting node in step 222, and the "tail" node proceeds to step 216 to establish a link as described above. Returning to steps 214 and 220, if in either case the determination was that there was not a received signal (Reserve AP or Post AP) respectively, the ND step (for this epoch) is complete. In either case, the node updates the next scan direction (224) and power level (228) (if a round is completed), and proceeds to step 206 to determine its role for the next step (i.e. next epoch).

When a link is established between nodes, whether through transmission of an AP Reserve (by a "tail" node) or receipt of an AP Reserve (by a "head" node), as indicated in step 216, the respective nodes will communicate in the agreed-upon slots in the next epoch. Each node type, "tail" or "head" then immediately proceeds to prepare ND for the next epoch by determining the next direction, next power level, and next role (i.e., head or tail). The scanning process continues in the manner described above.

While it is preferred that the method of the present invention be embodied in one or more computer programs and executed by a microprocessor-based controller or computer, it is to be understood that the method may be implemented and executed using digital and/or analog hardware by those skilled in the art.

By implementing the method of FIG. 6, the average time to discover a nearest neighbor (Average Discovery Time) is maintained at a low level, and a node is more likely to discover its nearer neighbor nodes. In the example there are eight power level increments, although the system may be configured for more or less power level increments, depending on the particular circumstances. As shown in FIG. 4A, the eight power levels correspond to progressively longer radial distances ($d_i$) from the node. At the first power level nodes within a range $R_1$ are discoverable. After completing the scan round at power level 1, the power level is incremented and extends to signal to a range $R_2$, which also includes all nodes within $R_1$. After again scanning in all directions, the power level is again incremented, and all nodes within $R_3$ are discoverable, including nodes within $R_1$ and $R_2$. This sequence continues for ranges $R_4$ through $R_8$, until the maximum range $R_8$ is covered by the scan, which includes all of the nodes within ranges $R_1$ through $R_7$. FIG. 4B illustrates 16 rounds or two complete scanning processes. As can be seen from the graph in FIG. 4B, nearest nodes within the $R_1$ range are scanned in every round (i.e., at every power level), and furthest nodes within $R_8$ are scanned only one time in every eight rounds. The advantages of the successive rounds of increasing power level are first, that nearest neighbors are discovered and linked to first: Shorter links makes co-channel interference between neighbors easier to control. Second, in this way the probability that two receiving nodes in the same direction at disparate distances will respond to the same AP Post is reduced. This reduces the chance of colliding responses at the "head" node in slot 9. Third, each announcement sends only enough power to reach neighbors at a specified range, thus reducing adverse detection by distant adversaries. The disadvantage is that the time to discover neighbors at longer ranges is correspondingly increased. These factors are traded as the ND process is configured for each mission.

Figure 7:
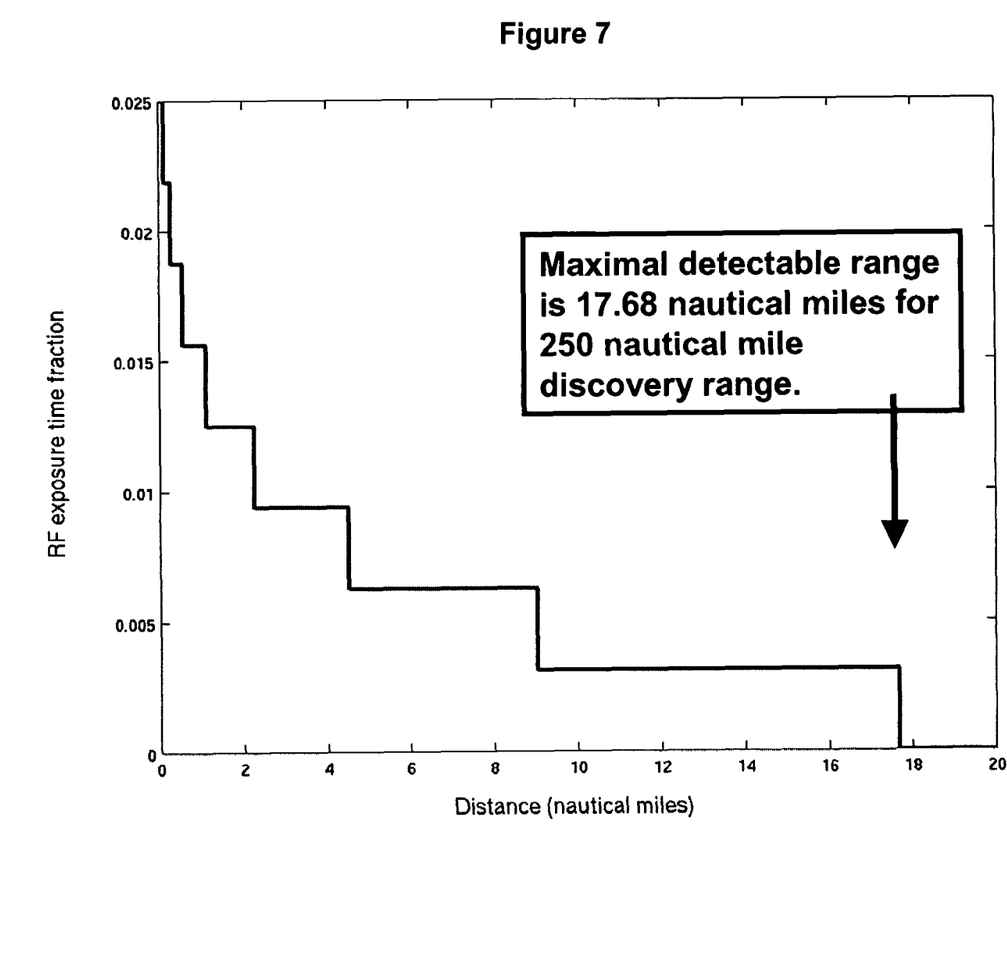
FIG. 7 is a graph depicting RF exposure time as a function of the distance between nodes.

FIG. 7 provides another graphical illustration of RF exposure as a fraction of the total time, as a function of distance. The equations that define the exposure time $\tau_{d_i}$ are as follows:

$$\tau_{d_i}(x, y, z) = \frac{1}{2} * \frac{SlotLength}{EpochLength} * \left(1 - \frac{i}{L}\right)$$

$$\tau(x, y, z) = \sum_{i=0}^{L-1} \tau_{d_i}(x, y, z) \times p_{d_i}$$

$$= \frac{1}{2} \times \frac{SlotLength}{EpochLength} \times \left( \sum_{i=0}^{L-1} \left(1 - \frac{i}{L}\right) \times \frac{R_{i+1}^3 - R_i^3}{R_L^3} \right)$$

In the example of FIG. 7, the greatest RF exposure time was 2.5% of the time, in the nearest detectable range corresponding to the lowest power level. The detectable distance at the first power level was approximately 0.1 nautical mile. The exposure time in the detectable range is that fraction of time for which the received RF energy is beyond some detectability threshold (−100 dBm in this example). Comparing FIGS. 5 and 7 it is apparent that discovery range is significantly larger than the detectable range for a given transmission power level. By assumption, a neighbor has a 25 dB processing gain advantage relative to an adversary, as discussed below. The RF exposure time was 0.5% of the time in the detectable range corresponding to the highest power level, which from FIG. 7 lies approximately between 9.0 and 17.68 nautical miles. The graph in FIG. 7 thus demonstrates the advantage of very low probability of detection. To be intercepted, the signal would have to be detected in the corresponding fraction of time that the transmit beam is exposed, and while the interceptor is aligned in the same direction as the transmitting node antenna. Thus, neighbor discovery time is traded for LPD as the distance between nodes increases. Nearby neighbors are more robust to packet loss rate, while neighbors in the farthest region have the highest level of LPD protection. LPD is of greater concern for far regions. The nearer the region, the less that LPD is a concern, due to nature of the concept of military operations. The LPD need for the nearer region is not as high as that of a region farther away The system also relies on processing gain to further reduce the probability of detection. Since the EIRP of a transmitting antenna (i.e., on the "head" node) is 25 dB lower than necessary to reach neighbors at max range, this loss in the spoiled beam must be compensated for by a correspondingly large processing gain in the receive modem (i.e., on the "tail" node). The data rate of the Post AP is at a minimum, with a maximum number of chips per bit. A modem that is aware of the non-linear coding scheme can then pull the signal from this low power spoiled beam, but to an adversary it will be indistinguishable from noise. The sidelobes of the PAAs used are presumed to be 25 dB down from the main beam when operated at high gain during normal communication slots. As such, adversaries are already presumed to require this type of sensitivity to detect the network from its sidelobe energy. A key feature of the ND invention is that the energy of its spoiled beam AP Post, which is inherently a blind announcement, is no greater than the sidelobe energy of a high gain beam directed at an established peer whose location is known. Indeed, it is primarily on this basis that neighbor discovery and link formation can be achieved with a low probability of detection. That is, directional energy is inherently hard to detect: A detecting adversary must either be in the main beam and so be easily detected himself, or be capable of detecting the presence of the network elements through their sidelobe energy. Our ND process achieves neighbor discovery and link formation at maximum range using blind APs without compromising this inherent advantage of directional antennas. By applying the concept of processing gain with directional antennas, it is possible for a transmitting node to announce itself at 25 dB reduction in signal power, and yet be detected at the maximum range by an "aware" receiver node, i.e., a node having the correct signal processing algorithm. After a successful discovery results in a data linkage, the receivers switch to normal processing gain (PG) mode, and the transmitters switch to normal highly directional beams for communications.

As illustrated by FIG. 5, the average discovery time for each range of eight ranges, is indicated as a function of distance between nodes, for various packet success rates (no packet loss is equal to 1.0; 30% packet loss is equal to 0.7). In the example of FIG. 5, the time to discover the furthest node is less than two minutes and thirty seconds for a test range up to twenty nautical miles (nm), although the system is capable of successfully discovering nodes separated by at least 250 nm. Discovery time increases as the distance increases. The discovery time is more sensitive to distance than to the packet success rates. For example, in one test the distance between two nodes being within the power level three range, the average discovery time is 97.48 seconds with 100% packet success rate; if the distance between the two nodes is within the power level one ranges, the average discovery time is 96.6 seconds with a 50% packet success rate.

The spatial aspect of the invention is possible through the use of directional antennas, because communications are carried through aligned antennas. If a pair of nodes are linked via a narrow beam transmitter, a second pair of nodes can communicate concurrently over the same frequency, provided the second pair is not directly aligned with the first pair. The two concurrent communications links within the same general space do not interfere with each other, thereby providing greater utilization of the available RF spectrum.

The spatial aspect of the invention may be further enhanced by the neighbor discovery process. Nodes that have no available resources to continue link formation can still continue the ND AP Post process. The AP might, for example, communicate the various directions and times in which the node is currently transmitting and receiving. This information enables other nodes to selectively link with other nodes so as to avoid interference with existing links. Thus in addition to implementing their primary management function of neighbor discovery and initial link activation, the control slots may be used to communicate other network management information.

The neighbor discovery algorithm provides a logical emulation of an omnidirectional antenna, by accomplishing over time a scan of the entire space, that which an omnidirectional antenna does instantaneously. The present invention however, does not reserve a separate frequency band, nor does it require a separate antenna to accomplish the neighbor discovery process. The scheme set forth enables the formation of the shortest links—those with the nearest neighbors—thereby localizing to the extent possible the use of available RF spectrum. Interference between neighbors is thereby easier to control.

It should be noted that the neighbor discovery process set forth above does not always result in a link between the nearest neighbors. Reasons may exist for not establishing a link after a new node has been identified. For example, resources may be fully utilized, scheduled for a higher priority link, reserved for higher-level processes to augment existing links in need of additional capacity, or prohibited under predetermined routing policies.

By reducing transmit power during "blind" (i.e., position of neighbor is unknown) announcements to side lobe levels, the neighbor discovery process of the present invention does not increase the probability of detection over the probability that is inherent during operational communications. Also, by compensating for this reduced power with processing gain, neighbor discovery occurs within the maximum range specified for operational communications. The neighbor discovery process thus assures that during a "blind" announcement process, the probability of being detected does not increase over the operational communications baseline. By providing multiple (e.g., 8) scan rounds at increasing power levels, LPD is enhanced—while transmitting at the minimum power required to reach near neighbors, potential collisions between responding nodes are reduced in the receiving slot. Further, by sending a limited amount of power in each announcement the probability that multiple receiving nodes will respond to the same announcement is reduced.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of mutually discovering relative locations of a plurality of mobile nodes to form a data communications network, the method comprising:
   initializing a signal transmission power level at a minimum power level;
   initializing an antenna scan direction in a first predetermined direction of a plurality of directions;
   randomly selecting, for each mobile node of the plurality of mobile nodes, to transmit or to receive an announcement packet during one scan direction;
   transmitting, by at least one node, an announcement packet via an antenna beam in response to randomly selecting to transmit an announcement packet, the antenna beam being directed in the predetermined direction in a first synchronized time interval;
   focusing, by at least one node, an antenna receiving beam to receive an announcement packet transmitted from a transmitting node in response to randomly selecting to receive an announcement packet in the first synchronized time interval;
   resetting the first predetermined direction of the plurality of directions and repeating the steps of transmitting an announcement packet and focusing a receiving beam in response to an announcement signal not being received by a receiving node; and
   repeating the steps of resetting the direction for each scan, and repeating the steps of transmitting an announcement packet and focusing a receiving beam in response to an announcement signal not being received by a receiving node until all of the plurality of directions have been scanned.

2. The method as set forth claim 1, also including:
   incrementing the power level by a predetermined power level increment in response to a reservation signal not being received by a transmitting node in all scan directions at the initial power level, and repeating the steps of transmitting an announcement packet and focusing a receiving beam in response to an announcement signal not being received by a receiving node, resetting the direction for all of the plurality of scan directions; for progressive power level increments until the signal transmission power level exceeds a predetermined maximum power level.

3. The method as set forth in claim 2, also including:
   transmitting a reservation signal from the receiving node back to the transmitting node in a second synchronized time interval, in response to a receiving node detecting an announcement packet from the transmitting node;
   negotiating a data link between the transmitting node and the receiving node in response to the transmitting node receiving the reservation signal from the receiving node;
   aligning the antenna from the transmitting node with the antenna from the receiving node in response to negotiating a data link; and
   configuring the transmitting node to transmit a narrow, directional high power beam for communication with the receiving node.

4. The method as set forth in claim 2, also including returning the transmission power level to the minimum power level and the antenna direction to the first predetermined direction and repeating the steps of randomly selecting to transmit or to receive an announcement packet during one scan direction; transmitting an announcement packet in a first synchronized time interval; and focusing by at least one node a receiving beam to receive an announcement packet transmitted from a transmitting node, until a data link is activated for the transmitting node.

5. The method of claim 1, wherein transmitting of the announcement packet is via a wide angle communication beam.

6. The method of claim 5, wherein the antenna receiving beam is a narrow angle communication beam for reception of an announcement packet.

7. A method of forming an ad hoc mobile network using a spatial time division multiple access protocol, comprising:
   synchronizing a plurality of mobile nodes to predefined epochs of time for communication scheduling;
   dividing the epochs of time into a plurality of equal time slots;
   designating at least two of the equal time slots as control signaling slots;
   simultaneously transmitting or receiving an announcement packet in a first control signaling time slot by the plurality of mobile nodes;
   transmitting a reservation signal by at least one mobile node in a second control signaling time slot in response to receiving a transmitted signal from at least one mobile node in the first control signaling time slot; and
   establishing a data link between the transmitting node and the receiving node in response to the transmitting node receiving a reservation signal and
   communicating between the transmitting and the receiving mobile nodes via directional antenna high gain high rate data link using at least two additional time slots of the plurality of equal time slots.

8. A method of forming a mobile ad hoc network of a plurality of mobile nodes using directional antennas comprising:
   randomly assigning each node of a plurality of nodes randomly between a transmitting node and a receiving node;
   directionally scanning over a predetermined range associated with a first power level with a first beam carrying an announcement signal, for a transmitting node;
   simultaneously with the scanning of the first beam, directionally scanning at a highest power level with a second beam, for a receiving node;
   increasing the level of the first power level to extend the predetermined range being scanned by the transmitting node, for a plurality of successive power level increments, up to a maximum power level;
   transmitting a reserve signal from the receiving node to the transmitting node the announcement signal; and
   establishing a data link between the receiving node and the transmitting node for high speed high gain operational communications in response to the receiving node receiving a transmitted signal from the transmitting node.

9. The method as set forth in claim 8, also including resetting the transmitting power level to the first power level and repeating the scanning steps for the first power level and for the successive power levels.

10. The method of claim 8, wherein the announcement signals and the reserve signals are transmitted according to the spatial time division multiple access protocol comprising:
   synchronizing a plurality of potentially mobile nodes to predefined epochs of time for communication scheduling;
   dividing the epochs of time into a plurality of equal time slots;

assigning at least two of the equal time slots as control signaling slots;

simultaneously transmitting or receiving an announcement packet in a first control signaling time slot;

transmitting a reservation signal in response to a received signal in a second control signaling time slot;

establishing a data link in response to receiving a reservation signal; and communicating between at least two mobile nodes via directional antenna high gain high rate data link using at least two of the plurality of equal time slots not assigned to control signaling.

11. The method as set forth in claim 8, wherein the first beam is configured as a wide angle spread beam.

12. The method as set forth in claim 8, wherein the second beam is configured as a narrow spread beam.

13. The method as set forth in claim 8, wherein the directional antenna is a phased array antenna.

14. The method as set forth in claim 13, wherein the phased array antenna is electronically guided to change directions within a time interval less than a predetermined epoch of time.

15. A mobile ad hoc communications network system comprising:

a plurality of mobile nodes;

a communications protocol for communications between mobile nodes;

each mobile node comprising at least one directional antenna, the at least one directional antenna having a plurality of power levels for scanning; and a control device for transmitting and receiving data packets, the control device being configured for adjusting a power level of the at least one directional antenna at a plurality of successively increasing power levels and directing the at least one directional antenna in a plurality of directions.

16. The system of claim 15, wherein the control device is also configured for resetting the first predetermined direction of the plurality of directions and repeating the steps of transmitting an announcement packet and focusing a receiving beam in response to an announcement signal not being received by a receiving node; repeating the steps of resetting the direction for each scan, and repeating the steps of transmitting an announcement packet and focusing a receiving beam in response to an announcement signal not being received by a receiving node, until all of the plurality of directions have been scanned.

17. The system of claim 16, wherein the control device is also configured for transmitting a reservation signal from the receiving node back to the transmitting node in a second synchronized time interval in response to a receiving node detecting a received announcement packet from the detected transmitting node; negotiating a data link between the transmitting node and the receiving node in response to the transmitting node receiving a reservation signal from the receiving node; aligning the transmitting node antenna with the receiving node antenna; and configuring the transmitting node signal carrier beam to a narrow, directional high power beam.

18. The system of claim 17, wherein the control device is also configured for incrementing the power level by a predetermined power level increment in response to a reservation signal not being received by a transmitting node in all scan directions at the initial power level, and repeating the steps of transmitting an announcement packet and focusing a receiving beam in response to an announcement signal not being received by a receiving node, resetting the direction for all of the plurality of scan directions, the power level being incremented in progressively greater power level increments until the signal transmission power level exceeds a predetermined maximum power level.

19. The system of claim 15, wherein the control device is also configured for randomly selecting, for each mobile node of the plurality of mobile nodes, to transmit or to receive an announcement signal during one antenna scan direction and transmits an announcement signal in response to randomly selecting to transmit an announcement packet; and focusing a receiving beam to receive an announcement signal transmitted from a transmitting node in response to randomly selecting to receive an announcement packet.

20. The system of claim 15, wherein the directional antenna is a phased array antenna is steerable in a plurality of directions.

21. The system of claim 20, wherein the phased array antenna is capable of changing directions within less than an epoch of 100 msec in duration.

* * * * *